June 6, 1961 W. ARTER, JR., ET AL 2,986,812
ONE-PIECE COMBINED FISHING LURE AND CAN OPENER
Filed Jan. 2, 1959
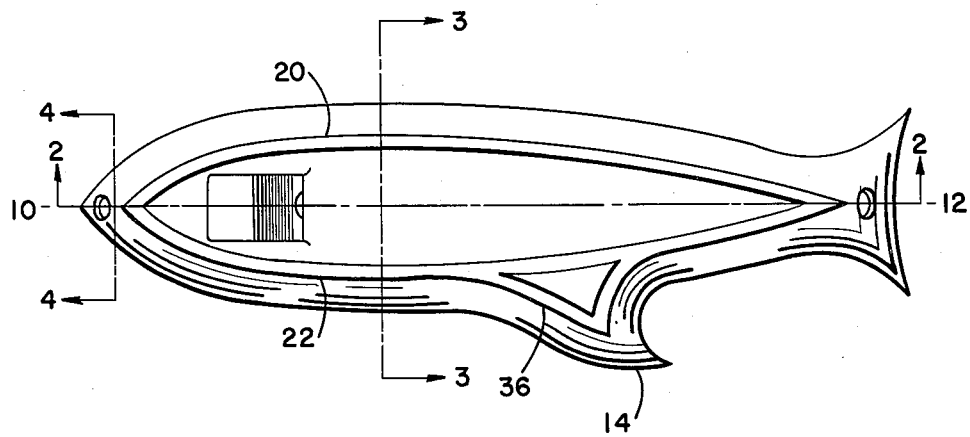
FIG. 1
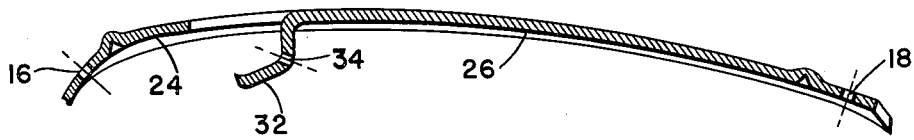
FIG. 2
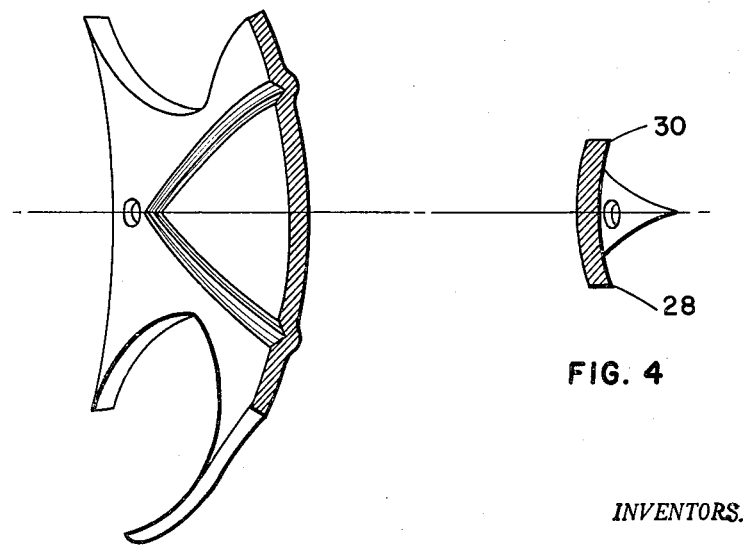
FIG. 3
FIG. 4
INVENTORS.
WILLIAM ARTER, JR.
ROBERT G. CLOUTHIER

United States Patent Office 2,986,812
Patented June 6, 1961

2,986,812
ONE-PIECE COMBINED FISHING LURE AND CAN OPENER
William Arter, Jr., Shrewsbury, and Robert G. Clouthier, Holden, Mass. (both of Northeast Engineering, Inc., 55 Millbrook St., Worcester, Mass.)
Filed Jan. 2, 1959, Ser. No. 784,689
2 Claims. (Cl. 30—123)

This invention relates to a new and improved fishing lure and can opener combination and the principal object of the invention resides in the provision of a single relatively simple article in the nature of wobbling fish lure spoon which is so formed, taking advantage of the features of the characteristics of a can opener, as to produce both an improved can opener and an improved fish lure in the same one-piece unitary body.

Other objects of the invention include the provision of a spoon shaped fishing lure having a forward pointed end which is specially curved and formed to provide a turbulence in the water as the lure is drawn along in the water, said pointed end providing an improved projecting point or cutting member for opening a can, in combination with a depressed hook or tang for engaging the bead or rim of the can being opened, said hook or tang forming an additional turbulence creating member for the fishing lure and also providing for the addition of various attractors or the like as well as for the connection of a fish hook thereto.

Other objects of the invention reside in the provision of a new and improved combined fish lure and can opener of the beer can type including combinations as will appear hereinafter and including a bottle cap removing device as well.

Further objects reside in the improvement of the wobble spoon type fishing lure as well as in improvement in the cutting action and easy operation of the beer can opener.

Other objects and advantages of the invention will appear hereinafter.

Reference is to be had to the accompanying drawings, in which

FIG. 1 is a view in side elevation showing the invention;

FIG. 2 is a section on line 2—2 of FIG. 1;

FIG. 3 is a section on an enlarged scale on line 3—3 of FIG. 1; and

FIG. 4 is a section on an enlarged scale on line 4—4 of FIG. 1.

In carrying out the present invention, there is provided a single one-piece body and which may be molded, cast, or stamped from metal, plastic, etc. This spoon shape is best shown from a comparison of FIGS. 2 and 3 but in general provides for a continuous longitudinal curve from the forward pointed end 10 of the lure to the rear end portion 12, as well as a transverse curve. It will be seen that in the illustration the lure is shaped more or less in the form of a fish having a bottom fin at 14 and this fin, as shown in FIG. 1, continues the transverse curved shape which is apparent in FIGS. 3 and 4.

The lure therefore is seen to be curved in two directions and this normally provides for a very effective wobble and darting motion of the lure, there being an aperture or the like at 16 in the head of the lure for the attachment of a fishing line thereto, and there is another aperture at the tail end as at 18 for the attachment of a fish hook or a ring for attaching a fish hook thereto.

The lure is provided with a double raised rib of a kind of tear-drop conformation as at 20 and 22, and this is for the purpose of providing a strengthening member, formed when the device is manufactured, to provide a lighter weight lure with a strong structural shape, in addition to the strengthening function of the curvature in the two directions as described above and as clearly shown in FIGS. 2 and 3. This provides strength for the can opener action also as will be more apparent hereinafter.

The head or forward end portion of the device in the general area indicated at 24 is curved more sharply than the general curvature in the body portion 26, and the result of this construction is that sharper edges are provided as at 28 and 30, leading from the point 10 inwardly. This provides for a much easier and faster cutting action when puncturing the can to be opened, than in the ordinary flat type can opener of the prior art. The present construction is beveled off at the cutting edges as is clearly shown in FIG. 4.

Between the ribs 20 and 22 and in the general head area of the device there is provided a downturned tang 32 which is used to engage the bead of the can when the same is to be punctured by the point at 10 in the usual manner of opening a beer can. This tang also increases the turbulence in the water as the lure is drawn along and provides likewise a support for another fish hook as by the aperture 34. This aperture 34 may also be used to string other attractors as beads, feathers, etc., which may be strung between apertures 34 and 18.

This tang becomes the fulcrum point of the opener and when braced against the bead or rim of the can provides proper clearance for the opening operation which as stated above is carried out much more easily with the present device due to the transverse curve in the area 24 as above described. The remainder of the body of the lure 26 becomes the handle when the device is used as a can opener.

If desired the strengthening rib 22 can also descend as at 36 into the lower fin portion at 14 in order to assist in strengthening the same and other variations may be made without departing from the scope of the invention.

It will be seen that the spoon shape of the lure provides the device with a strong structural shape allowing a lighter gauge metal to be used thus reducing costs and weight. The raised ribs 20 and 22 also add to the eye appeal of the device and additional structural strength. Since the device is made in the form of a small fish or minnow, advantage is taken of the forward head portion thereof at 24 which has a sharp pointed end 10 allowing for opening a can but also for providing a shape like a fish.

The tang at 32 has a double function, as does the head portion 24, and the double function of the tang resides in the provision of the fulcrum point for the can opening operation and a convenient support for extra hooks, wobble plates, spinners, extra weights, etc.

Furthermore the front head design which is required for the opener, also gives the lure a fish-like appearance and the body of the "fish" held by the hand is shaped to appear as live bait and at the same time to act as a handle for the opener. The presence of the tang 32 allows the provision of a hole which is out of line or offset from the main body portion of the lure 26, and this increases the darting action of the lure. Also the use of the tang varies the center of gravity if no hook is applied thereto and variable weights which can be applied change the action of the lure and also allows the same to sink to a lower fishing depth for trolling.

Having thus described our invention, we do not wish to be limited to the details herein disclosed, otherwise than as set forth in the claims, but what we claim is:

1. A can opener comprising a one-piece elongated body member in the general shape of a fish and including a head portion and a tail portion, the head portion terminating in a point and the point and the adjacent side edges of the body member being sharp, the side edges continuing along the body member to an area remote from the head, the side edges at said area then extending convergently and then divergently to form the tail portion, said body member being transversely curved and longitudinally curved, and a tang on the body member intermediate the head and tail portion for cooperation with the pointed head for opening a can and for the attachment of hooks or fish attractors thereto in a plane spaced from that of the fish lure body.

2. A can opener comprising a curved elongated body member in the general form of a fish having a pointed head portion at one end, sharpened edges on the said pointed head portion, the head portion being transversely curved to provide a shearing action for use as a can opener, and a tang pressed down from and out of the general plane of the body member, but at the same side of the body member as the pointed head, the pointed head being curved to a greater degree than the general curvature of the entire body member, said tang providing a fulcrum point for the device when used as a can opener and to apply other devices thereto when used as a fishing lure.

References Cited in the file of this patent

UNITED STATES PATENTS

| | | |
|---|---|---|
| D. 99,976 | Lesti et al. | June 9, 1956 |
| D. 143,327 | La Forte | Dec. 25, 1945 |
| D. 155,314 | Pessina | Sept. 20, 1949 |
| D. 160,695 | De Fee | Oct. 31, 1950 |
| D. 171,413 | Lipman | Sept. 20, 1949 |
| 2,046,879 | Leppke | July 7, 1936 |
| 2,570,474 | Novitzky | Oct. 9, 1951 |
| 2,596,959 | Roes | May 13, 1952 |
| 2,671,960 | Rudd | Mar. 16, 1954 |
| 2,721,414 | Ross | Oct. 25, 1955 |
| 2,770,877 | Bird | Nov. 20, 1956 |
| 2,774,170 | Baker | Dec. 18, 1956 |
| 2,790,264 | Rickard | Apr. 30, 1957 |